Figure 1:
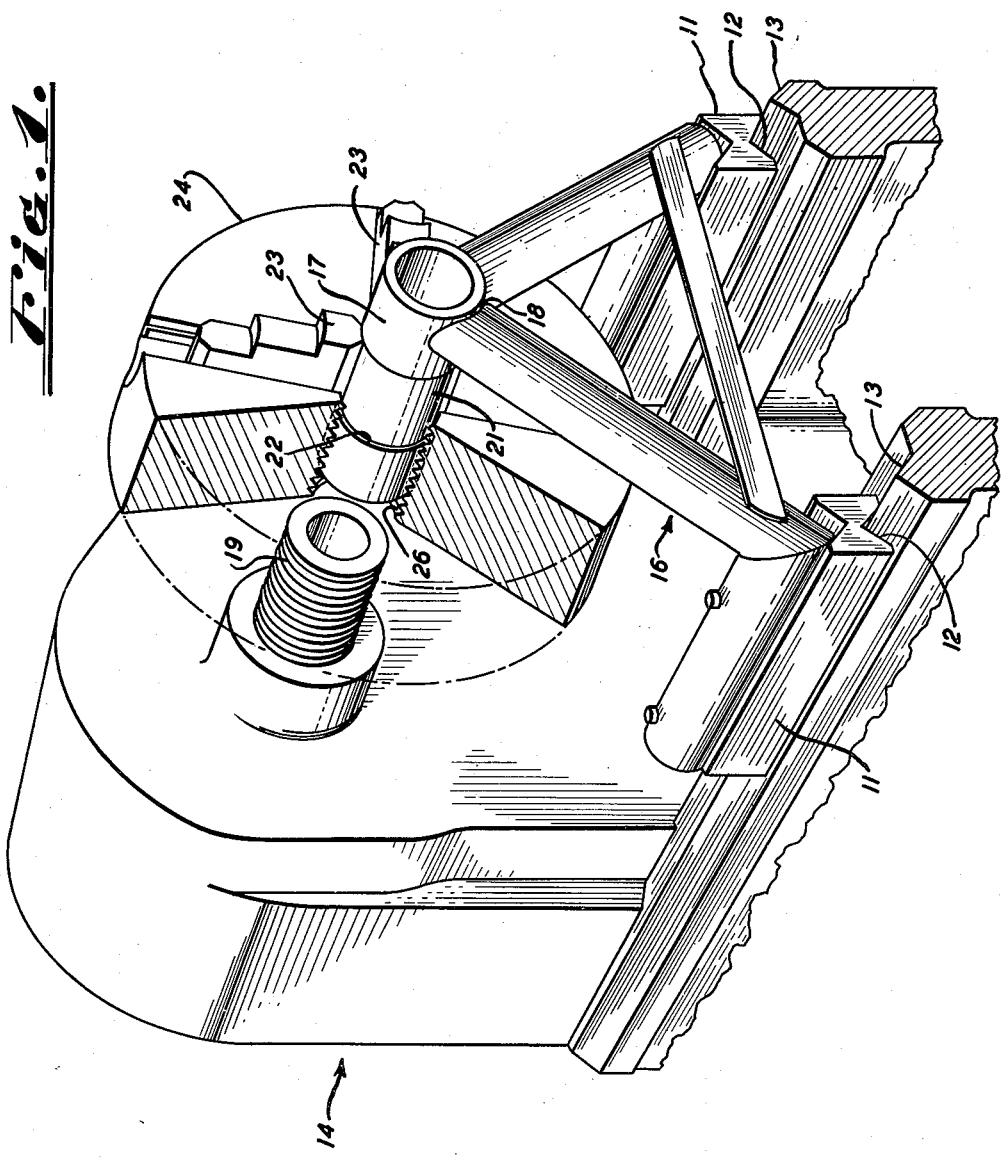

Feb. 5, 1952     C. R. TERRY     2,584,169
LATHE CHUCK SUPPORT
Filed April 28, 1949

INVENTOR.
CLIFFORD R. TERRY
BY
ATTORNEY

Patented Feb. 5, 1952

2,584,169

UNITED STATES PATENT OFFICE 2,584,169

LATHE CHUCK SUPPORT

Clifford R. Terry, San Diego, Calif.

Application April 28, 1949, Serial No. 90,212

4 Claims. (Cl. 82—34)

(Granted under the act of March 3, 1883, as amended April 30, 1928; 370 O. G. 757)

This invention relates to a chuck support, and more particularly to a chuck support for supporting a chuck during mounting and demounting from a lathe spindle and during storage of the chuck when not in use.

Heretofore when mounting a chuck on a lathe spindle, considerable difficulty has been experienced in aligning the chuck with the spindle so that the female threads on the chuck would easily start on to the male threads of the spindle. This difficulty increases with the size and weight of the chuck, and leads to the possibility of stripping or cross-threading the threads on either the chuck or the spindle. Furthermore, when demounting a heavy chuck from a lathe, it is often necessary to utilize several men to support the chuck as it leaves the spindle, so that the chuck does not drop suddennly onto the guideways of the lathe and damage them.

It is an object of this invention to provide a chuck support which will obviate the above disadvantages.

It is another object of this invention to provide a chuck support which enables one operator to mount or demount a chuck of any size without danger to himself or to the equipment.

It is a still further object of this invention to provide a chuck support which can be used to support a chuck during storage, to prevent the damaging of the chuck.

Other objects and many of the attendant advantages of this invention will be readily appreciated as the same becomes better understood by reference to the following description.

This invention comprises generally a base portion, or pair of spaced parallel runners having on a face of each a V slot adapted to slidably mount on the guideways of a lathe bed. A frame is secured to and extends upwardly from the runners, connecting them together. From the frame a tubular spindle extends over the runners, parallel thereto, and in line with the spindle of the lathe. The tubular spindle is undercut on a portion of its circumference to provide a shoulder over which the jaws of a chuck can be clamped to restrain the chuck from axial movement on the spindle.

A preferred embodiment of the instant invention has been illustrated in the accompanying drawing, wherein:

Fig. 1 is a perspective view of the instant invention, supporting a chuck partially broken away to show the lathe spindle.

Referring to the drawing, the numeral 11 designates two runners having V slots 12 on the bottom faces thereof, adapted to slidably mount on the guideways 13 of the bed of a lathe 14. A frame 16 is secured to the runners 11, connecting them together and extending upwardly therefrom. A tubular spindle 17 is secured to the frame at 18. The spindle 17 extends over, and is parallel to, the runners 11 and is in line with the threaded spindle 19 of the lathe 14, spindle 17 is thereby in position to support or receive a chuck 24 during the mounting or demounting of the chuck. A portion of the circumference of the spindle 17 is reduced at 21 to provide a shoulder 22 on the spindle 17 over which the jaws 23 of the chuck 24 may be clamped to restrain it from axial movement on the spindle 17.

Operation

To mount the chuck 24 onto the lathe spindle 19, the chuck is first mounted onto the tubular spindle 17 of the chuck support and the jaws 23 clamped over the reduced portion 21 of the spindle 17; the shoulder 22 then prevents axial movement of the chuck 24 in relation to the spindle 17. A hoisting cable can then be passed through the tubular spindle 17 and the chuck and support placed on the lathe 14, the V slots 12 of the runners 11 being mounted on the guideways 13 of the lathe bed. The assembly (support and chuck) is then slid along the ways until the threaded bore 26 of the chuck 24 abuts the end of the spindle 19.

The lathe is then started at slow speed and the spindle 19 screws itself into the chuck bore 26. The runners 11 slide along the guideways following the lead of the thread on the spindle 19. When the chuck is partially on the spindle 19, the lathe can be stopped, the jaws 23 unclamped, and the chuck support slid away from the chuck and the lathe spindle 19.

For demounting a chuck from the lathe spindle 17, the procedure is reversed. The chuck support is again slid into abutment with the spindle. The chuck is loosened and upon reversing of the lathe, the chuck feeds itself off the spindle 19 of the lathe and onto the spindle 17 of the chuck support.

In practice, it has been found convenient to provide a chuck support for each chuck, even when in storage, so that the chuck is always either mounted on a lathe or on a chuck support.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A chuck support for supporting a chuck during mounting on, and demounting from a lathe, comprising a pair of spaced, parallel runners having on a face of each a V slot adapted to slidably mount on the guideways of the bed of the lathe, a frame secured to and extending upwardly from said runners and connecting same, and a tubular spindle secured to said frame, extending over said runners, parallel thereto, and in line with the spindle of the lathe and adapted to receive a lathe chuck during mounting and demounting, said spindle having a shoulder thereon to permit clamping of chuck jaws thereover to restrain the chuck from axial movement.

2. A chuck support for supporting a chuck during mounting on, and demounting from a lathe, comprising a pair of spaced, parallel runners having on a face of each a V slot adapted to slidably mount on the guideways of the bed of the lathe, a frame secured to and extending upwardly from said runners and connecting same, and a spindle secured to said frame, extending over said runners, parallel thereto, and in line with the spindle of the lathe and adapted to receive a lathe chuck during mounting and demounting.

3. A chuck support for use with a lathe having a threaded spindle, a chuck having a threaded bore mountable on said spindle and including radially adjustable jaws, and spaced guideways parallel to and positioned at a lower level than the spindle; comprising a pair of runners slidable on said guideways, a frame secured to and connecting said runners, and a support spindle carried by said frame in alignment with the lathe spindle and having a portion shaped to enter the bore of said chuck in slidable relation and a reduced portion engageable by said jaws to restrict sliding movement of the chuck on the support spindle.

4. A chuck support for use with a lathe having a threaded spindle, a chuck having a threaded bore mountable on said spindle and including radially adjustable jaws, and spaced guideways parallel to and positioned at a lower level than the spindle; comprising a pair of runners slidable on said guideways, a frame secured to and extending upwardly from said runners and a spindle supported by said frame in alignment with the lathe spindle and having an end portion shaped to enter the bore of the chuck to support the chuck in slidable relation and another portion engageable by said jaws to restrict slidable movement of the chuck on the support spindle.

CLIFFORD R. TERRY.

REFERENCES CITED

The following references are of record in the file of this patent:

UNITED STATES PATENTS

| Number | Name | Date |
| --- | --- | --- |
| 517,466 | Levin | Apr. 3, 1894 |
| 741,081 | Thiebaud | Oct. 13, 1903 |
| 2,276,538 | Fey | Mar. 17, 1942 |
| 2,315,393 | Bowerman | Mar. 30, 1943 |

FOREIGN PATENTS

| Number | Country | Date |
| --- | --- | --- |
| 189,561 | Switzerland | May 18, 1937 |
| 472,015 | Great Britain | Sept. 15, 1937 |